US010178648B2

(12) United States Patent
Balasubramanian et al.

(10) Patent No.: US 10,178,648 B2
(45) Date of Patent: Jan. 8, 2019

(54) TECHNIQUES AND APPARATUS FOR REDUCING OCCURRENCE OF ONE OR MORE COLLISIONS OF PAGING USING AN ASYNCHRONOUS CELL

(71) Applicant: QUALCOMM Incorporated, San Diego, CA (US)

(72) Inventors: Ravi Balasubramanian, La Jolla, CA (US); Shahabuddin Mohammad, San Diego, CA (US); Qingxin Chen, San Diego, CA (US); Ammar Kitabi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/933,044

(22) Filed: Mar. 22, 2018

(65) Prior Publication Data

US 2018/0343638 A1 Nov. 29, 2018

Related U.S. Application Data

(60) Provisional application No. 62/510,084, filed on May 23, 2017.

(51) Int. Cl.
*H04W 68/00* (2009.01)
*H04W 68/02* (2009.01)
*H04W 74/08* (2009.01)
*H04W 76/28* (2018.01)
*H04W 88/06* (2009.01)

(52) U.S. Cl.
CPC ....... *H04W 68/02* (2013.01); *H04W 74/0825* (2013.01); *H04W 76/28* (2018.02); *H04W 88/06* (2013.01)

(58) Field of Classification Search
CPC . H04W 88/06; H04W 16/14; H04W 72/1215; H04W 72/082; H04W 72/0446; H04W 74/0808
See application file for complete search history.

(56) References Cited

U.S. PATENT DOCUMENTS

| | | | |
|---|---|---|---|
| 8,265,661 | B2 | 9/2012 | Chin et al. |
| 8,634,383 | B2 | 1/2014 | Chin et al. |
| 9,107,117 | B2 | 8/2015 | Krishnamoorthy et al. |
| 9,408,183 | B2 | 8/2016 | Chirayil et al. |
| 2011/0205984 | A1* | 8/2011 | Lee ............... H04B 1/0053 370/329 |
| 2011/0207453 | A1* | 8/2011 | Hsu ............... H04W 88/06 455/424 |

(Continued)

*Primary Examiner* — Khalid Shaheed
(74) *Attorney, Agent, or Firm* — Harrity & Harrity, LLP

(57) ABSTRACT

Certain aspects of the present disclosure generally relate to wireless communication. In some aspects, a wireless communication device may identify occurrence of one or more collisions of paging of a first radio access technology (RAT) and paging of a second RAT, wherein the second RAT is associated with an asynchronous deployment; and/or identify a target cell of the second RAT to reduce occurrence of the collisions, wherein the target cell has at least one of a different temporal system frame numbering or a different system frame timing configuration than a serving cell of the wireless communication device, and wherein the target cell is identified using a primary common control physical channel (PCCPCH) of the target cell. Numerous other aspects are provided.

29 Claims, 9 Drawing Sheets

(56) References Cited

U.S. PATENT DOCUMENTS

2015/0382285 A1* 12/2015 Anand .............. H04W 36/0061
 455/436
2017/0353893 A1   12/2017 Marwah et al.

* cited by examiner

TECHNIQUES AND APPARATUS FOR REDUCING OCCURRENCE OF ONE OR MORE COLLISIONS OF PAGING USING AN ASYNCHRONOUS CELL

CROSS-REFERENCE TO RELATED APPLICATIONS UNDER 35 U.S.C. § 119

This application claims priority to Provisional Patent Application No. 62/510,084, filed May 23, 2017, entitled "TECHNIQUES AND APPARATUSES FOR REDUCING OCCURRENCE OF ONE OR MORE COLLISIONS OF PAGING USING AN ASYNCHRONOUS CELL," which is hereby expressly incorporated by reference herein.

FIELD OF THE DISCLOSURE

Aspects of the present disclosure generally relate to wireless communication, and more particularly to techniques and apparatuses for reducing occurrence of one or more paging collisions using an asynchronous cell.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication performed by a user equipment (UE) may include identifying occurrence of one or more collisions of paging of a first radio access technology (RAT) and of paging a second RAT associated with the UE, wherein the second RAT is associated with an asynchronous deployment; and/or identifying a target cell of the second RAT to reduce the occurrence of one or more collisions, wherein the target cell has at least one of a different temporal system frame numbering or a different system frame timing configuration than a serving cell of the UE, and wherein the target cell is identified using a primary common control physical channel (PCCPCH) of the target cell.

In some aspects, a wireless communication device may include a memory and one or more processors operatively coupled to the memory. The one or more processors may be configured to identify occurrence of one or more collisions of paging of a first radio access technology (RAT) and of paging a second RAT, wherein the second RAT is associated with an asynchronous deployment; and/or identify a target cell of the second RAT to reduce the occurrence of one or more collisions, wherein the target cell has at least one of a different temporal system frame numbering or a different system frame timing configuration than a serving cell of the wireless communication device, and wherein the target cell is identified using a primary common control physical channel (PCCPCH) of the target cell.

In some aspects, a non-transitory computer-readable medium may store one or more instructions for wireless communication. The one or more instructions, when executed by one or more processors of a wireless communication device, may cause the one or more processors to identify occurrence of one or more collisions of paging of a first radio access technology (RAT) and of paging a second RAT, wherein the second RAT is associated with an asynchronous deployment; and/or identify a target cell of the second RAT to reduce the occurrence of one or more collisions, wherein the target cell has at least one of a different temporal system frame numbering or a different system frame timing configuration than a serving cell of the wireless communication device, and wherein the target cell is identified using a primary common control physical channel (PCCPCH) of the target cell.

In some aspects, an apparatus for wireless communication may include means for identifying occurrence of one or more collisions of paging of a first radio access technology (RAT) and of paging a second RAT associated, wherein the second RAT is associated with an asynchronous deployment; and/or means for identifying a target cell of the second RAT to reduce the occurrence of one or more collisions, wherein the target cell has at least one of a different temporal system frame numbering or a different system frame timing configuration than a serving cell of the apparatus, and wherein the target cell is identified using a primary common control physical channel (PCCPCH) of the target cell. Numerous other aspects are provided.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
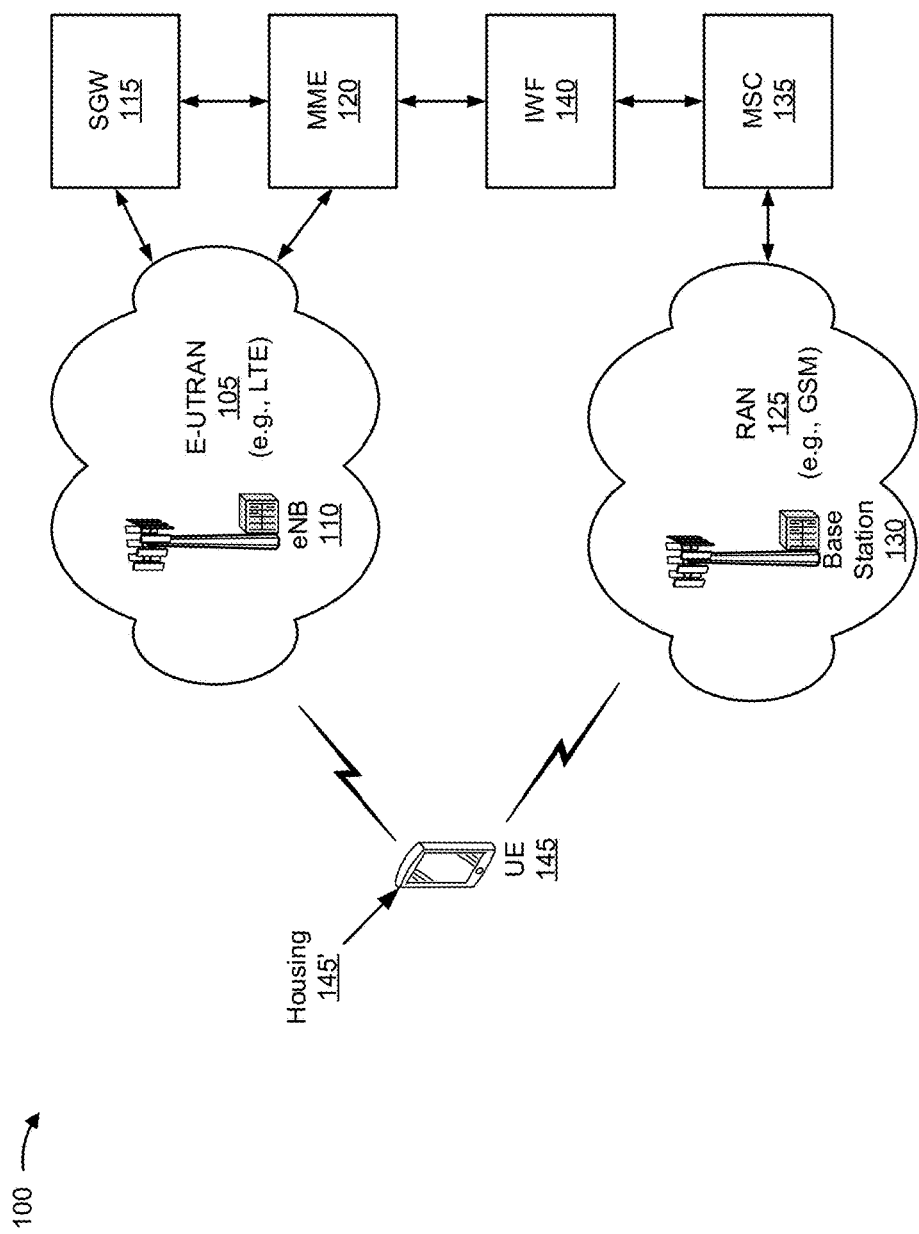
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more base stations such as evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP Technical Specification (TS) 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
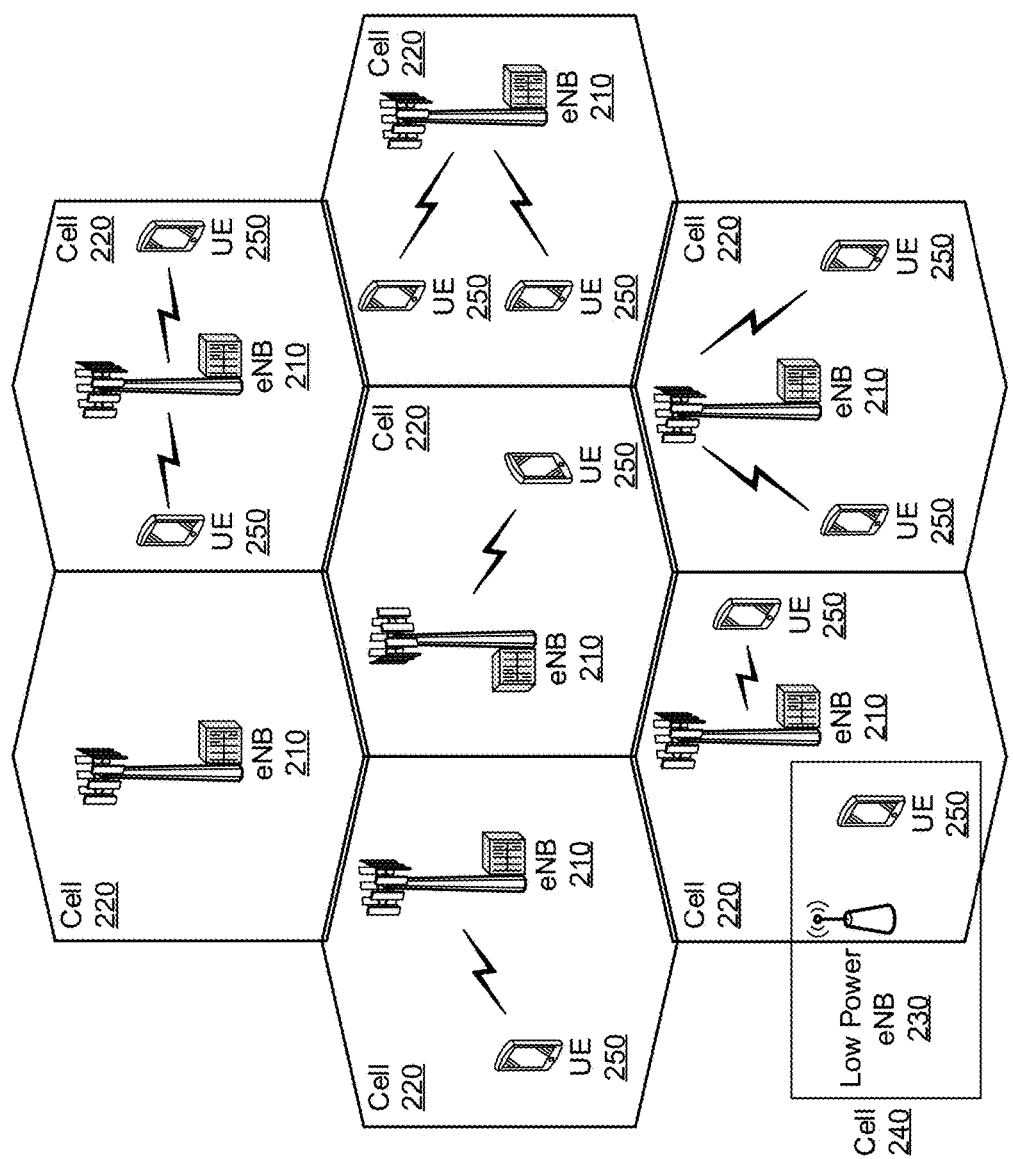
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more base stations such as eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA), GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
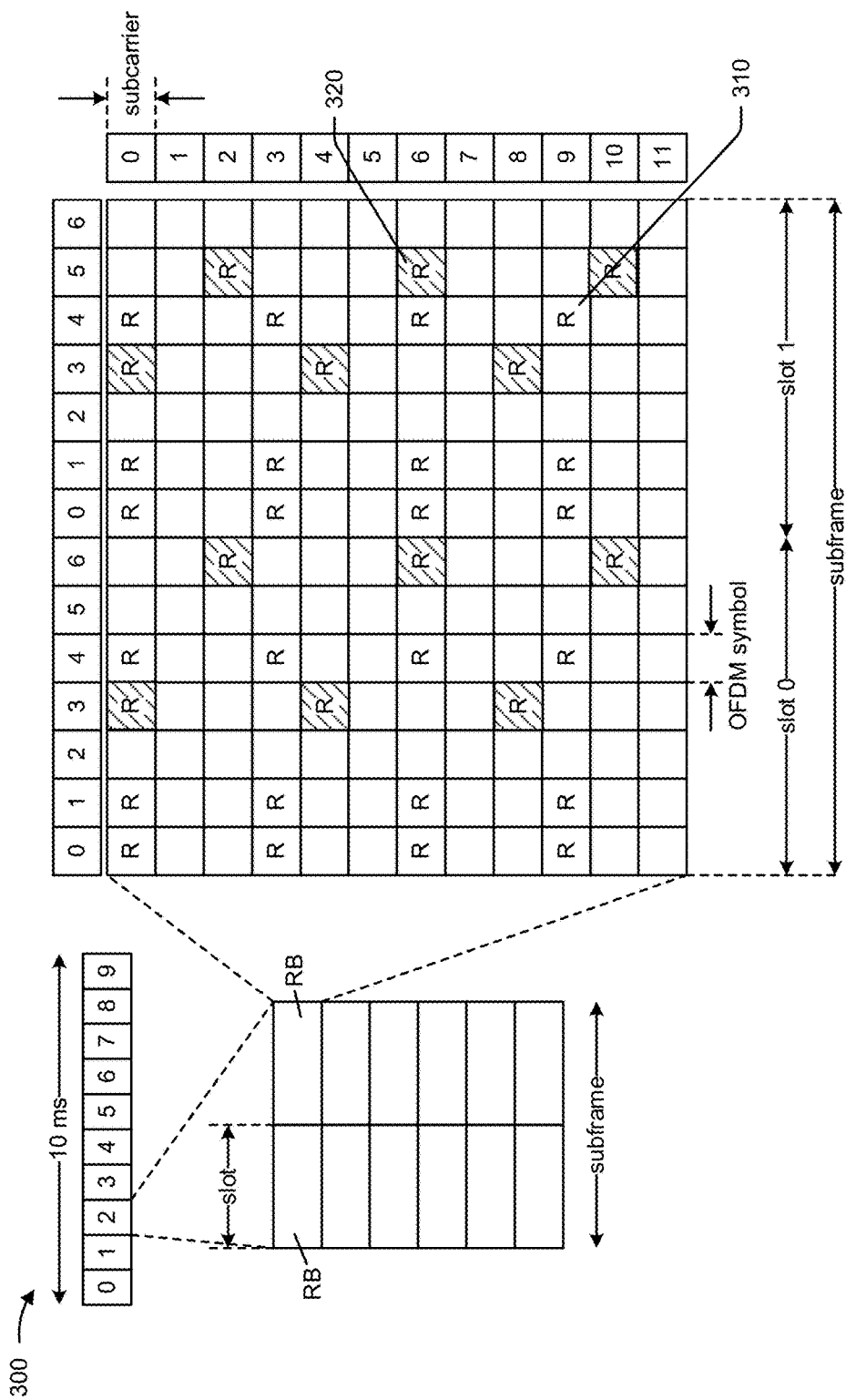
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
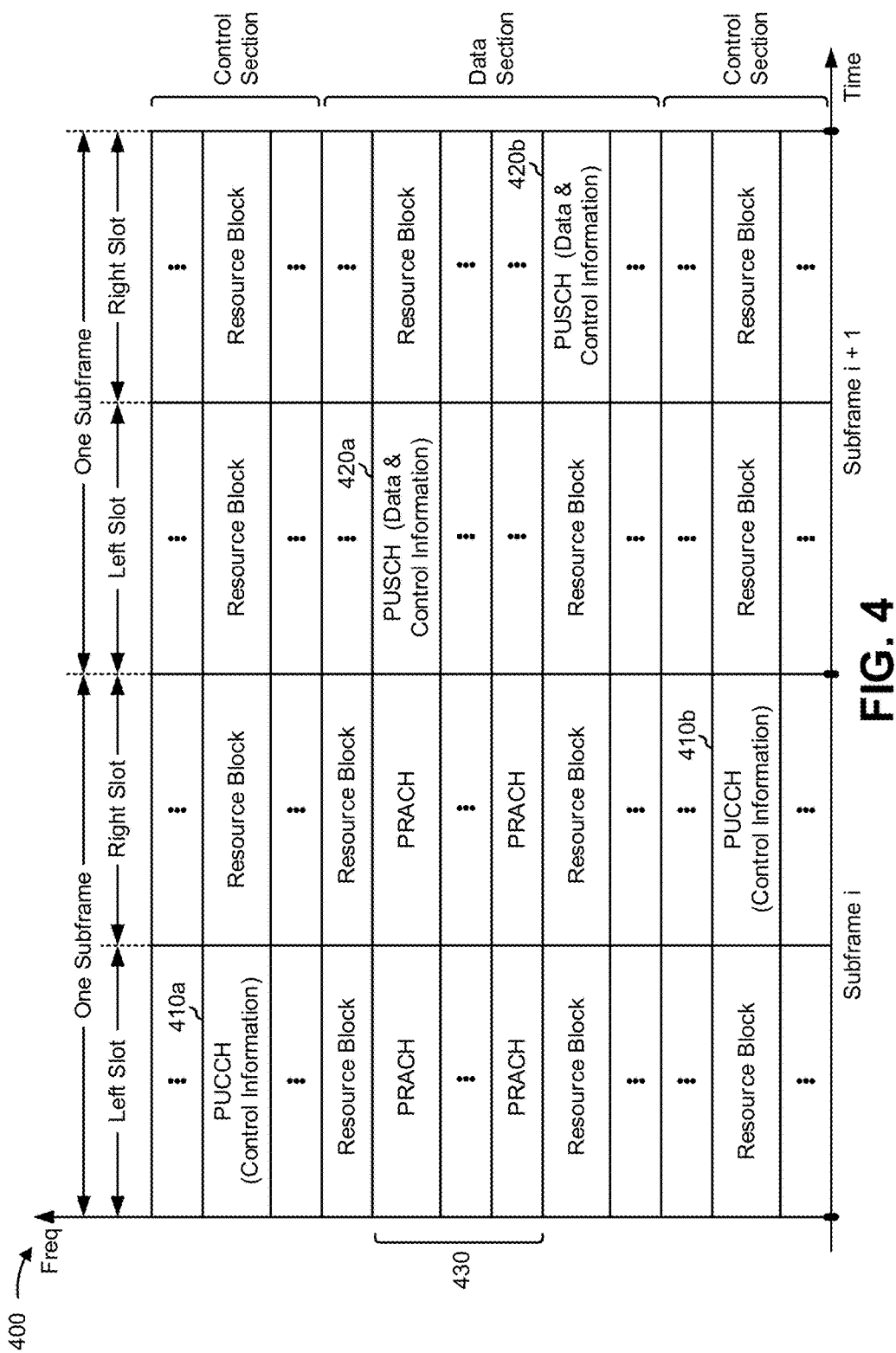
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
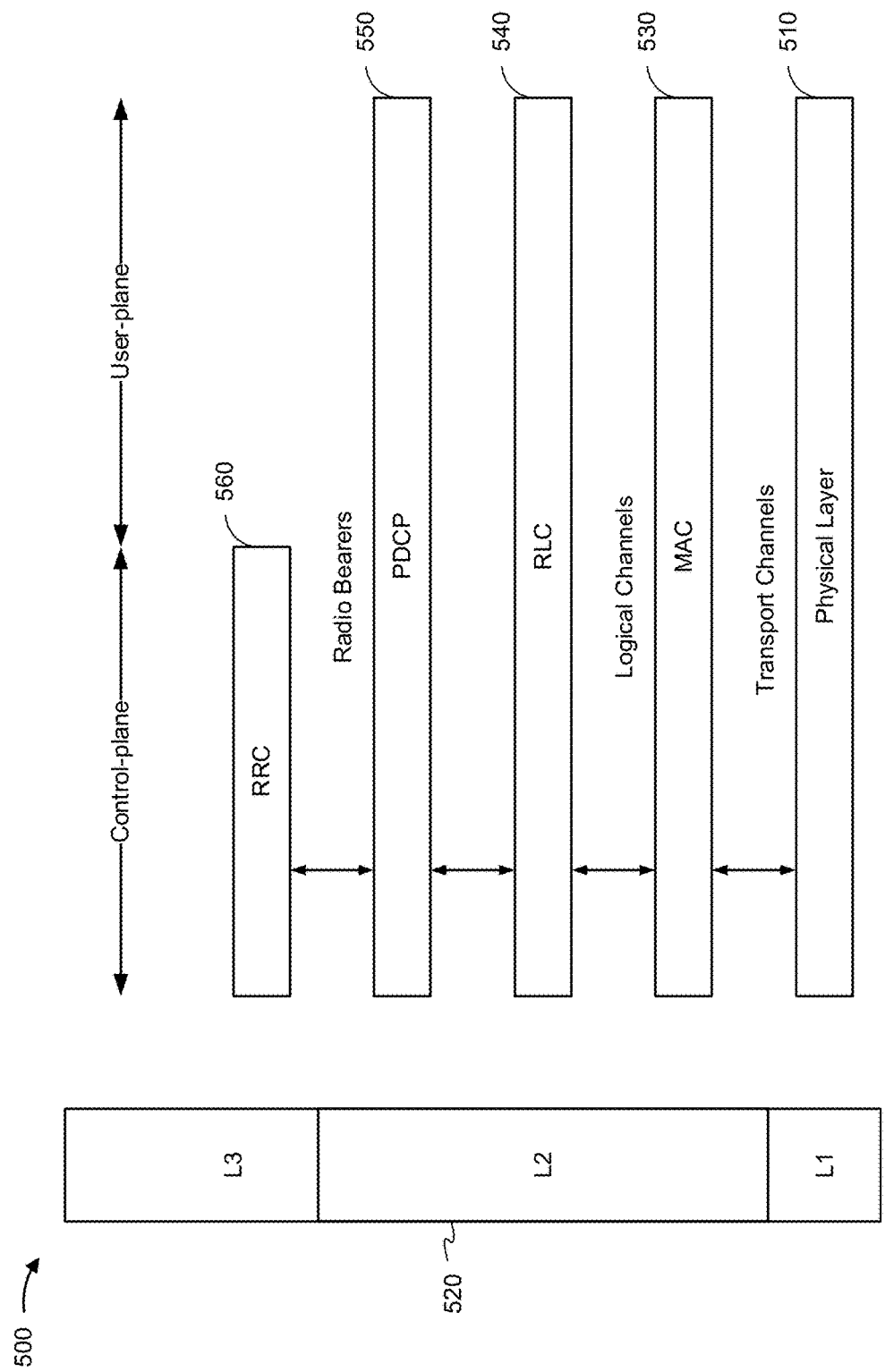
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
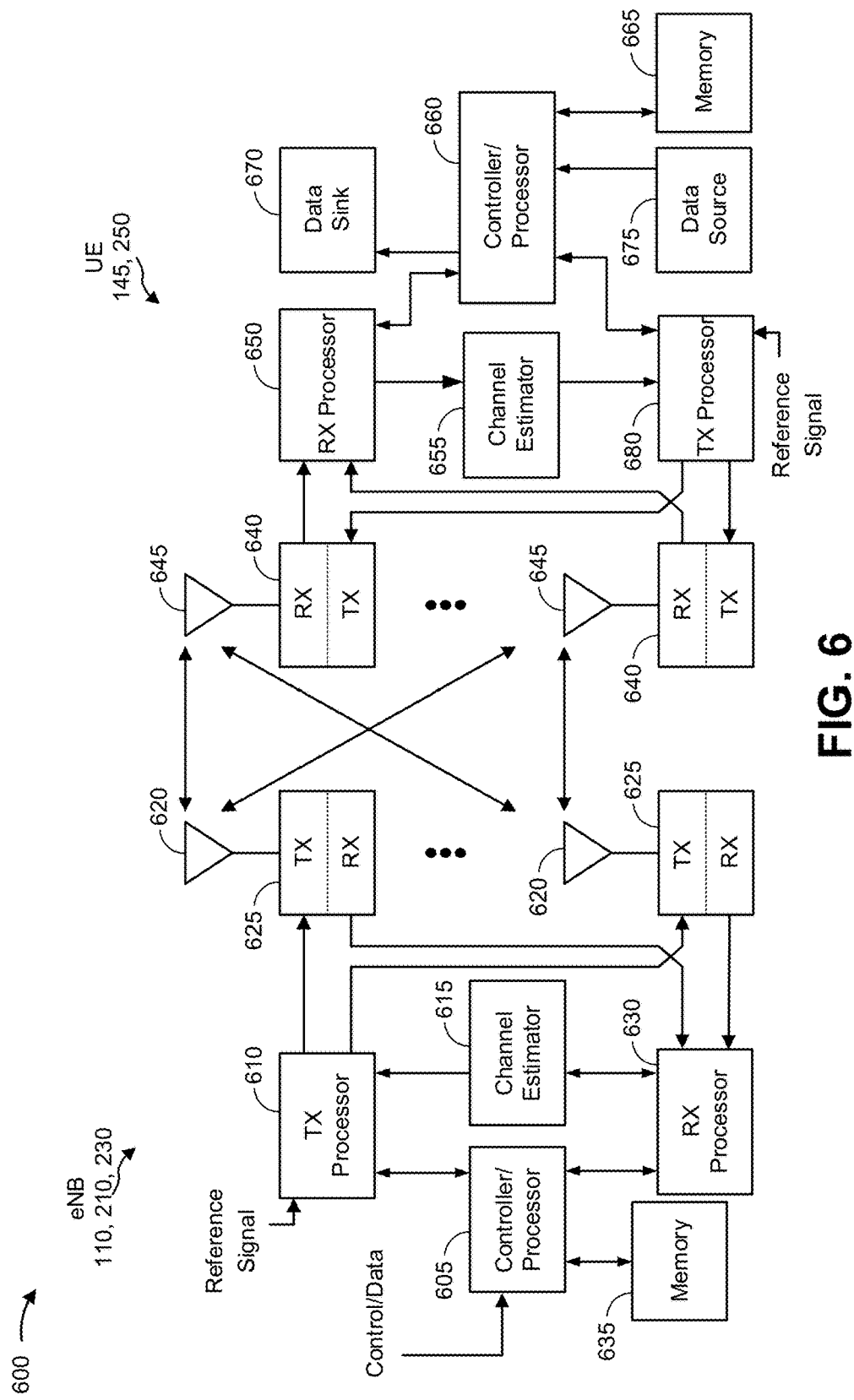
FIG. 6 is a diagram illustrating example components of base station, such as an evolved Node B, and a user equipment in an access network, in accordance with various aspects of the present disclosure.

FIG. 6 is a diagram illustrating example components 600 of a base station such as an eNB 110, 210, 230 and a UE 145, 250 in an access network, in accordance with various aspects of the present disclosure. In some aspects, eNB 110, 210, 230 is referred to as a base station. In some aspects, base station and eNB may be used interchangeably herein. As shown in FIG. 6, eNB 110, 210, 230 may include a controller/processor 605, a transmit (TX) processor 610, a channel estimator 615, an antenna 620, a transmitter 625TX, a receiver 625RX, a receive (RX) processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates a radio frequency (RF) carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to perform reduction of occurrence of one or more collisions of paging using an asynchronous cell, as described in more detail elsewhere herein. For example, the controller/processor 660 and/or other processors and modules of UE 145, 250 may perform or direct operations of, for example, process 800 of FIG. 8 and/or other processes as described herein. In some aspects, one or more of the components shown in FIG. 6 may be employed to perform example process 800 and/or other processes for the techniques described herein.

In some aspects, UE 145, 250 may include means for identifying occurrence of one or more collisions of paging of a first radio access technology (RAT) and paging of a second RAT associated with the UE 145, 250, means for identifying a target cell of the second RAT to reduce occurrence of the collisions, and/or the like. In some aspects, such means may include one or more components of UE 145, 250 described in connection with FIG. 6.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

A UE 145, 250 may communicate with an eNB 110, 210, 230 based at least in part on a discontinuous reception (DRX) cycle. For example, the UE 145, 250 may enter a low power state, such as a sleep mode or idle mode, and may awaken at predefined times to perform paging and/or transmit or receive traffic. In some aspects, the predefined times may be based at least in part on a DRX cycle length, such as 640 ms, 1280 ms, and/or the like. In some aspects, a UE 145, 250 may be configured with multiple, different subscriber identity module (SIM) cards, and may use the multiple different SIM cards to communicate on corresponding RATs. Such a UE 145, 250 may be referred to as a dual-SIM dual-standby UE (e.g., when the UE 145, 250 is capable of being camped on two RATs at the same time) or a dual-SIM dual-active UE (e.g., when the UE 145, 250 is capable of being in active mode with regard to two RATs at the same time). For a dual-SIM dual-standby UE 145, 250, each RAT may be associated with a respective DRX cycle, and the UE 145, 250 may use a radio frequency (RF) chain (e.g., a transmit chain and/or receive chain) to perform the paging occasions prescribed by the respective DRX cycles for each RAT.

In some cases, the paging occasions of two or more RATs may align. For example, the DRX cycle lengths of the two or more RATs may be equal or multiples of each other. In such a case, and when the paging occasions overlap in time, the UE 145, 250 may have to select one RAT for which to perform a paging occasion. This may lead to a reduction in paging performance of the UE 145, 250 (e.g., of up to 50 percent when all paging occasions overlap).

Some techniques and apparatuses, described herein, improve a paging success rate of the UE 145, 250 in the case of a persistent paging collision by identifying a target cell, associated with an asynchronous RAT, that has a different system frame timing configuration than a serving cell of the UE 145, 250. By identifying the target cell associated with the different system frame timing configuration, the UE 145, 250 can switch from a conflicting cell to the target cell, thereby reducing and/or eliminating the paging collision. Furthermore, some techniques and apparatuses described herein are performed while the UE 145, 250 is camped on a first cell and on the conflicting cell, which reduces delay associated with performing the reselection and conserves resources of the UE 145, 250 that would otherwise be used to collect the data used to perform the reselection in an active mode.

Still further, some techniques and apparatuses described herein can identify the target cell without reading a particular system information block (e.g., SIB-5) of the target cell, for example, by reading a primary common control physical channel (PCCPCH) of the target cell, which further reduces delay and conserves resources associated with the reselection process. For example, since PCCPCH may be transmitted frequently (e.g., every slot, every subframe, etc.), latency associated with the reselection process may be reduced. Even further, by storing information associated with neighbor cells, reselection to a target cell of the neighbor cells is expedited in comparison to a situation in which the information associated with the target cell must be collected after the target cell is selected for reselection. In some aspects, paging success is increased and throughput is improved without changing a system frame number on which paging is performed on the target cell.

Figure 7A:
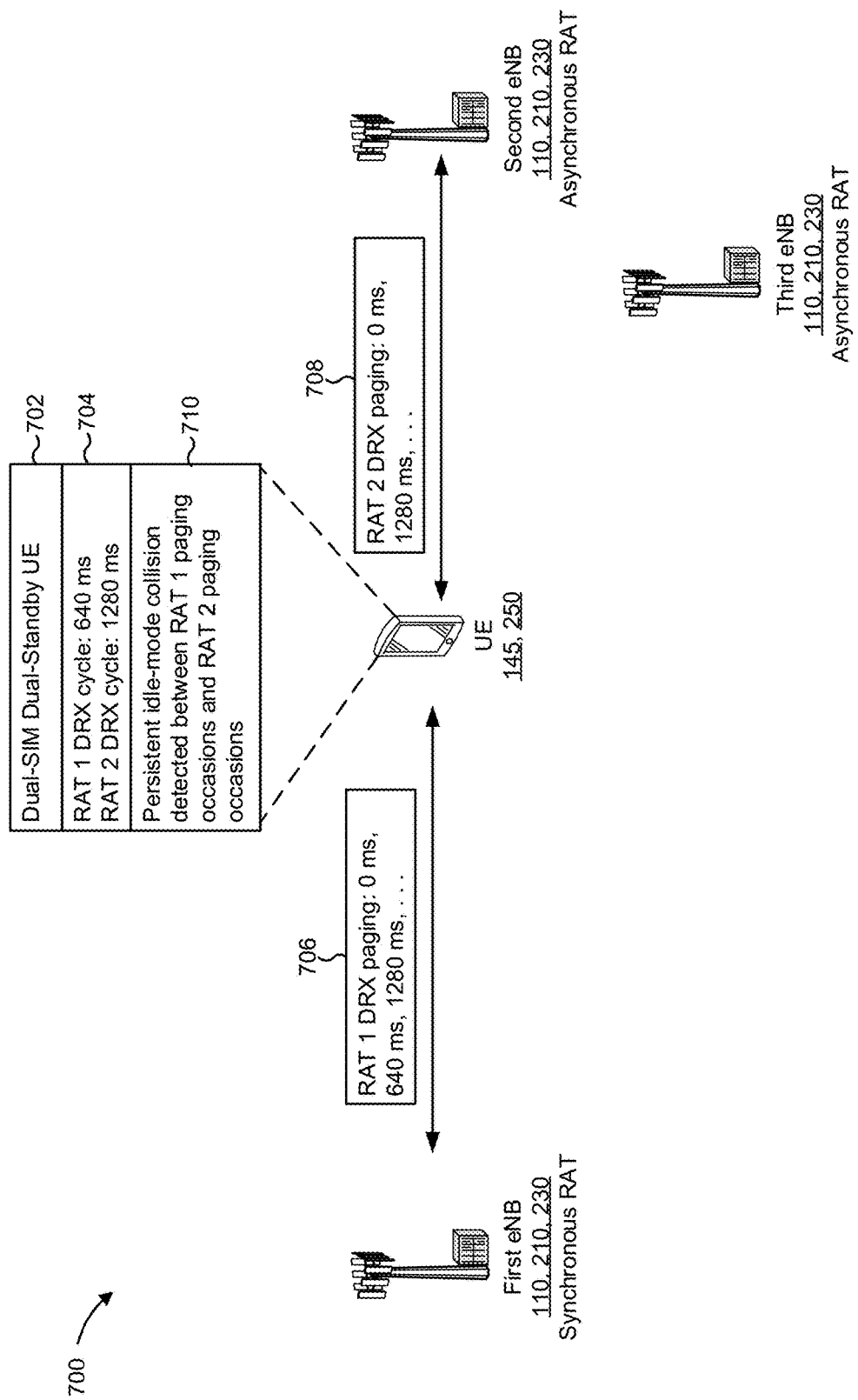
FIGS. 7A and 7B are diagrams illustrating examples of selecting a target cell associated with an asynchronous radio access technology (RAT) based at least in part on detecting occurrence of one or more paging collisions, in accordance with various aspects of the present disclosure.
Figure 7B:
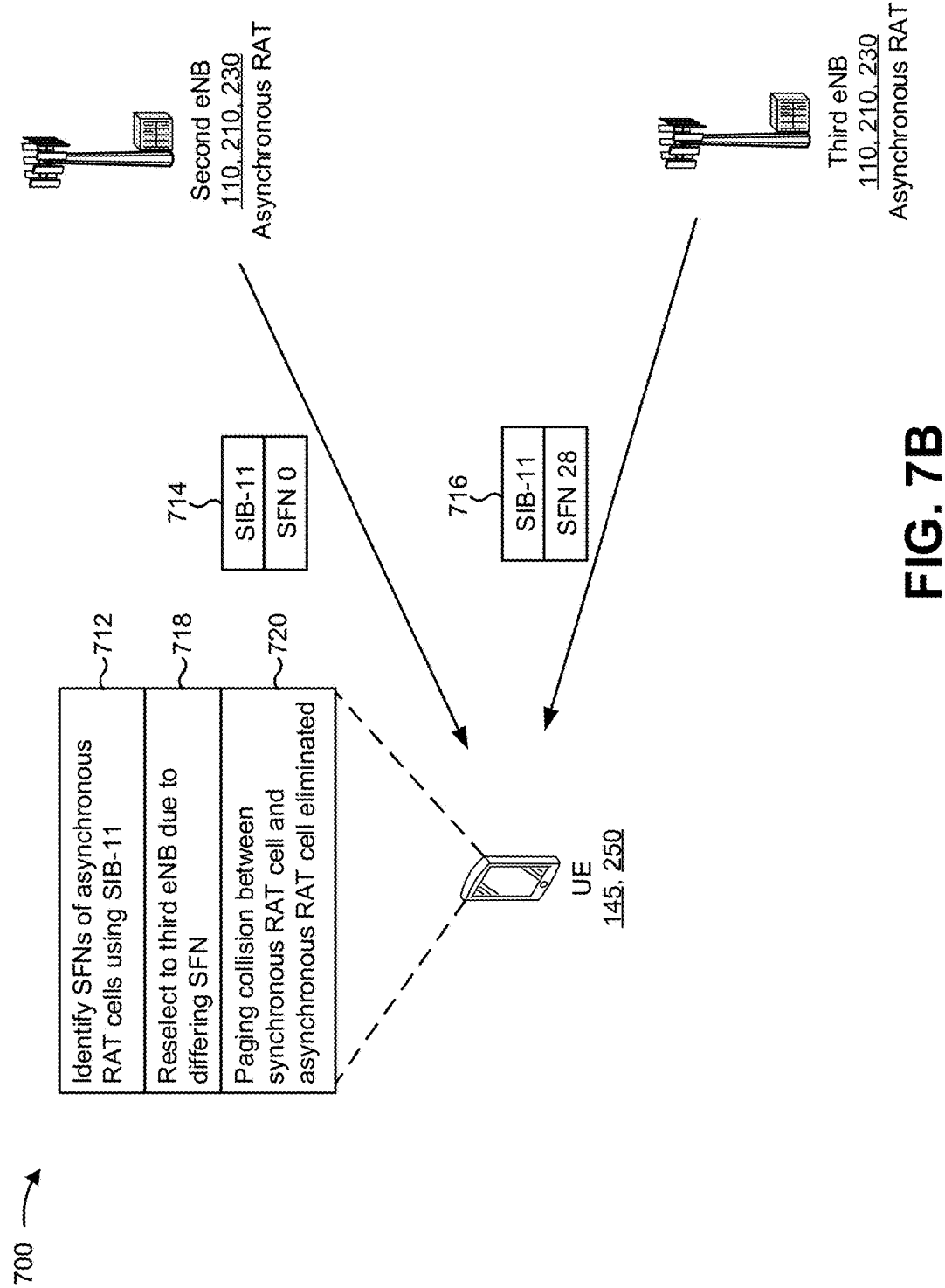

FIGS. 7A and 7B are diagrams illustrating examples 700 of selecting a target cell associated with an asynchronous radio access technology (RAT) based at least in part on detecting a paging collision, in accordance with various aspects of the present disclosure. For the purpose of FIGS. 7A and 7B, assume that a UE 145, 250 is camped on cells provided by a first base station 110, 210, 230 (shown as first eNB 110, 210, 230) and a second base station 110, 210, 230 (shown as second eNB 110, 210, 230), and assume that the UE 145, 250 is covered by a cell provided by a third base station 110, 210, 230 (shown as third eNB 110, 210, 230). For example, and as shown by reference number 702, the UE 145, 250 may be a dual-SIM dual-standby UE that is camped with regard to the first base station 110, 210, 230 and the second base station 110, 210, 230.

As further shown, the cell provided by the first base station 110, 210, 230 may be associated with a synchronous RAT (e.g., LTE, GSM, and/or the like) and the cells provided by the second base station 110, 210, 230 and the third base station 110, 210, 230 may be associated with an asynchronous RAT (e.g., WCDMA and/or the like). In a synchronous RAT, different base stations 110, 210, 230 coordinate with each other to provide cells with the same system frame timing. In an asynchronous RAT, system frame timing of different cells and/or base stations 110, 210, 230 may be different.

As shown by reference number 704, a first RAT (e.g., RAT 1, associated with the first base station such as an eNB 110, 210, 230) may be associated with a DRX cycle length of 640 ms, and a second RAT (e.g., RAT 2, associated with the second base station 110, 210, 230) may be associated with a DRX cycle length of 1280 ms. As shown by reference number 706, for example, the UE 145, 250 may perform paging with regard to RAT 1 according to the DRX cycle length of 640 ms. For example, the UE 145, 250 may awaken every 640 ms (e.g., at 0 ms, 640 ms, 1280 ms, and so on) to monitor for paging. As shown by reference number 708, for example, the UE 145, 250 may monitor for paging with regard to RAT 2 according to the DRX cycle length of 1280 ms. For example, the UE 145, 250 may awaken every 1280 ms (e.g., at 0 ms, 1280 ms, 2560 ms, and so on). In such a case, the UE 145, 250 may experience paging collisions at 0 ms, 1280 ms, 2560 ms, and so on, since the paging occasions associated with RAT 1 and RAT 2 overlap and align with each other. For example, the UE 145, 250 may need to hold an RF chain for only one of the overlapping paging occasions, which leads to loss of data associated with the other of the overlapping paging occasions.

In some aspects, a paging occasion may be determined based at least in part on information associated with a particular cell. As one example, for WCDMA, a system frame number (SFN) of a paging occasion may be determined according to the equation:

$$\text{Paging Occasion SFN} = (\text{IMSI div K}) \bmod \text{DRX Cycle length} + n * \text{DRX Cycle length},$$

where IMSI corresponds to an International Mobile Subscription Identity of a SIM Card associated with the particular cell, K identifies a number of secondary common control physical channels (SCCPCHs) available on the particular cell, and n is a value that increments with each paging occasion.

In some aspects, the paging occasions may not exactly overlap. For example, the UE 145, 250 may need to hold an RF chain for a particular length of time before and/or after a paging occasion to complete the paging occasion. In such a case, when the paging occasions are near in time and separated by less than the particular length of time, a paging collision may occur. In some aspects, the particular length of time may include, for example, 20 ms or a different value.

As shown by reference number 710, the UE 145, 250 may detect persistent occurrence of collision of idle-mode paging with regard to paging occasions of RAT 1 and paging occasions of RAT 2 (e.g., paging collision). For example, the UE 145, 250 may determine that the paging occasions of RAT 1 and the paging occasions of RAT 2 overlap each other. Additionally, or alternatively, the UE 145, 250 may determine that the paging occasions of RAT 1 and the paging occasions of RAT 2 are within a particular length of time of each other.

In some aspects, the UE 145, 250 may detect the paging collision based at least in part on at least one of channel quality or signal strength information. For example, the UE 145, 250 may determine a channel measurement of channels associated with the first base station 110, 210, 230 and the second base station 110, 210, 230, and may detect a collision when the channel measurement satisfies a threshold. Additionally, or alternatively, for a WCDMA RAT, the UE 145, 250 may detect the paging collision based at least in part on a reference signal code power (RSCP) or a signal to noise ratio (SNR) determined based at least in part on a common pilot channel (CPICH) signal of a cell of the base station 110, 210, 230.

As shown in FIG. 7B, and by reference number 712, the UE 145, 250 may identify system frame information (e.g., SFNs) of asynchronous RAT cells (e.g., cells provided by the second and third base stations 110, 210, 230). In some aspects, the UE 145, 250 may identify the system frame information based at least in part on detecting the paging collision. For example, the UE 145, 250 may identify the SFNs based at least in part on respective system information blocks (SIBs) provided by the second and third base stations 110, 210, 230. As shown by reference number 714, the second base station 110, 230, 230 may provide SIB-11 identifying an SFN 0. As shown by reference number 716, the third base station 110, 210, 230 may provide SIB-11 identifying an SFN 28.

In some aspects, the UE 145, 250 may identify the SFNs based at least in part on a primary common control physical channel (PCCPCH) transmitted by the second base station 110, 210, 230 and/or the third base station 110, 210, 230. For example, the second base station 110, 210, 230 and/or the third base station 110, 210, 230 may transmit the PCCPCH regularly (e.g., every slot, every frame, and/or the like). The PCCPCH may identify system frame information, such as a subframe number of each base station 110, 210, 230. In some aspects, the PCCPCH may identify information used by the UE 145, 250 to determine the system frame number or paging occasion. For example, the PCCPCH may identify a number of SCCPCH available for the cell, and the UE 145, 250 may use this information to determine the paging occasion, using the equation described above. The UE 145, 250 may store the system frame information (e.g., using an acquisition database and/or the like), and may use the stored system frame information to identify a target cell associated with a different system frame timing configuration than the colliding cell (e.g., provided by the second base station 110, 210, 230), as described in more detail below. In some implementations, the UE 145, 250 may detect other signals in addition to the PCCPCH, such as a common pilot channel (CPICH). The CPICH may be broadcasted at constant power and with a known bit sequence, and may be used to perform channel estimation.

In some aspects, the UE 145, 250 may determine the PCCPCH based at least in part on detecting occurrence of one or more collisions with regard to or associated with the second base station 110, 210, 230. For example, the UE 145, 250 may listen to the PCCPCH of the third base station 110, 210, 230, and/or other neighboring base stations 110, 210, 230 associated with the asynchronous RAT, when a paging collision is detected.

As shown by reference number 718, the UE 145, 250 may determine to reselect to the third base station 110, 210, 230 due to a frame timing offset of the third base station 110, 210, 230 with regard to the second base station 110, 210, 230. For example, the UE 145, 250 may determine a frame offset of each cell associated with an asynchronous RAT (e.g., provided by the third base station 110, 210, 230 and/or other base stations), and may select the third base station 110, 210, 230 based at least in part on the frame timing offset. For example, the UE 145, 250 may select the third base station 110, 210, 230 based at least in part on the third base station 110, 210, 230 being associated with at least a threshold offset value (e.g., threshold system frame timing offset value). As shown by reference number 720, the paging collision between the cell associated with a first or synchronous RAT and the cell associated with the asynchronous RAT is reduced and/or eliminated based at least in part on the reselection.

In some aspects, the UE 145, 250 may store information identifying frame timing offsets of particular cells and/or base stations. For example, the frame timing offsets may identify offsets between a serving cell frame timing and frame timing of the particular cells and/or base station. In some aspects, the UE 145, 250 may store the information in a database (e.g., a SIB database and/or the like). In such a case, the information may be associated with or include a particular identifier (e.g., a UTRA Absolute Radio Frequency Channel Number (UARFCN), a primary scrambling code (PSC), a public land mobile network (PLMN) identifier, a cell identifier, and/or the like). The UE 145, 250 may rank cells and/or base stations based at least in part on the stored information, and may select one of the ranked cells and/or base stations 110, 210, 230 for reselection. The storage of frame timing offsets of neighbor cells with respect to the serving cell frame timing may help with faster identification of synchronous and asynchronous cells. For example, consider an LTE+WCDMA paging collision scenario with a WCDMA Cell A colliding with an LTE Cell. Consider the system frame offset of WCDMA neighbor cells with reference to the serving cell as follows:

SFN Offset of Cell B=20
SFN Offset of Cell C=20
SFN Offset of Cell D=0.

By storing the frame timing offsets, the UE 145, 250 can quickly determine that Cell A (e.g., the WCDMA Cell A) and Cell D are synchronous with each other, and that Cell B and C are synchronous with each other. Thus, any reselection decisions during a collision scenario involving any of Cells A, B, C or D can be quickly identified.

In some aspects, the UE 145, 250 may reselect to another base station 110, 210, 230 (e.g., another base station 110, 210, 230 associated with the second RAT) based at least in part on a minimum frame timing offset. For example, the UE 145, 250 may determine the minimum frame timing offset based at least in part on a page duration associated with the synchronous RAT or the asynchronous RAT. As a more particular example, the UE 145, 250 may determine the minimum frame timing offset based at least in part on a worst page duration (e.g., a longest page duration) associated with the synchronous RAT and/or the asynchronous RAT. By using the minimum frame timing offset, the UE 145, 250 prevents reselection to a cell with a frame timing that still overlaps with the frame timing of the first eNB 110, 210, 230.

In some aspects, the UE 145, 250 may reselect to the third base station 110, 210, 230. For example, the UE 145, 250 may cause a handover to the third base station 110, 210, 230 to occur. Additionally, or alternatively, the UE 145, 250 may provide information indicating that the third base station 110, 210, 230 is a preferred target for a handover. In such a case, a serving base station 110, 210, 230 (e.g., the first or second base station 110, 210, 230) of the UE 145, 250 may initiate the handover based at least in part on a cell reselection condition (e.g., an LTE cell reselection condition, a WCDMA cell reselection condition, a GSM cell reselection condition, and/or the like). In a situation where the cell reselection condition is not satisfied, the UE 145, 250 may prioritize and/or reselect to a highest-ranked cell associated with an asynchronous RAT when a cell suitability criterion is satisfied. For example, the ranking and/or the cell suitability criterion may be based at least in part on a frame timing offset of the highest-ranked cell, a signal strength of the highest-ranked cell, a signal quality of the highest-ranked cell, and/or the like. In some aspects, the UE 145, 250 may determine whether the cell reselection condition is satisfied and/or may determine the cell ranking based at least in part on a measurement that is determined using the CPICH of one or more of the base stations 110, 210, 230.

In some cases, paging occasions of two or more asynchronous cells may collide. For example, assume that a value of K (e.g., the number of SCCPCH available on a target cell) is different among two asynchronous cells. In such a case, there is a chance that paging occasions of the two asynchronous cells may still collide. For example, consider two WCDMA cells with different K values and equivalent IMSI values (since IMSI is a property of the SIM card). In such a case:

Cell A=DRX Cycle=640, K=1 and IMSI (Last three digits=030), and
Cell B=DRX Cycle=640, K=2 and IMSI (Last three digits=030).
Furthermore,
Paging Occasion SFN of Cell A=(30 div 1) mod 64=30, 94, 158 . . . n, n+64, and
Paging Occasion SFN of Cell B=(30 div 2) mod 64=15, 79, 143 . . . n, n+64.

In this scenario, paging occasions of the two cells will collide for one case when the SFN offset between Cell A and Cell B is around 15 frames (or 150 ms). However, the probability of paging occasions of an LTE cell colliding with paging occasions of two asynchronous cells A and B is the probability of two independent events. The probability of collision for LTE+WCDMA with a 640 ms DRX cycle may be equal to approximately 3.9 percent. As an illustration, the probability of paging occasions of an LTE cell colliding with paging occasions of two WCDMA asynchronous cells may be equal to a collision probability of the first cell multiplied by a collision probability of the second cell. Thus, in one aspect, the probability of such an event may be approximately 0.1 percent. However, techniques and apparatuses described herein may reduce and/or eliminate occurrence of one or more paging collisions. For example, by selecting a target cell having at least one of a different temporal system frame numbering for reselection, even if the K value of a neighbor WCDMA cell is unknown to the UE 145, 250, techniques and apparatuses described herein may preclude the need to read SIB information (e.g., SIB-5) to determine a K value of the SCCPCH (thus eliminating the need to camp on the target cell), and may permit the usage of PCCPCH information to determine whether the neighbor cell is asynchronous. Thus, resources that would otherwise be used to read SIB information to determine the K value are conserved without significantly impacting the likelihood of collision with multiple asynchronous cells.

As an example of the benefits provided by some techniques and apparatuses described herein, consider a Collision scenario in LTE+WCDMA with WCDMA configured with 6 WCDMA neighbors. To determine the value of K of each neighbor cell, the UE 145, 250 may need to read MIB (master information block) and SB (scheduling blocks). Scheduling information may indicate scheduling periodicity of each System Information (SIB1, SIB5 etc.), repetition period and the number of segments. In some cases, SIB 5 has 3 segments, and with HS-RACH, SIB 5 may need more segments. Thus, reading SIB 5 for each neighbor cell and determining Paging SFN will take considerable time and power. Some techniques and apparatuses described herein determine asynchronous cells and non-colliding cells with a very high probability by only reading PCCPCH and CPICH of neighbor cell. PCCPCH and CPICH is transmitted on every slot and hence identification of synchronous and asynchronous cells is significantly quicker and saves power.

As indicated above, FIGS. 7A and 7B are provided as examples. Other examples are possible and may differ from what was described with respect to FIGS. 7A and 7B.

Figure 8:
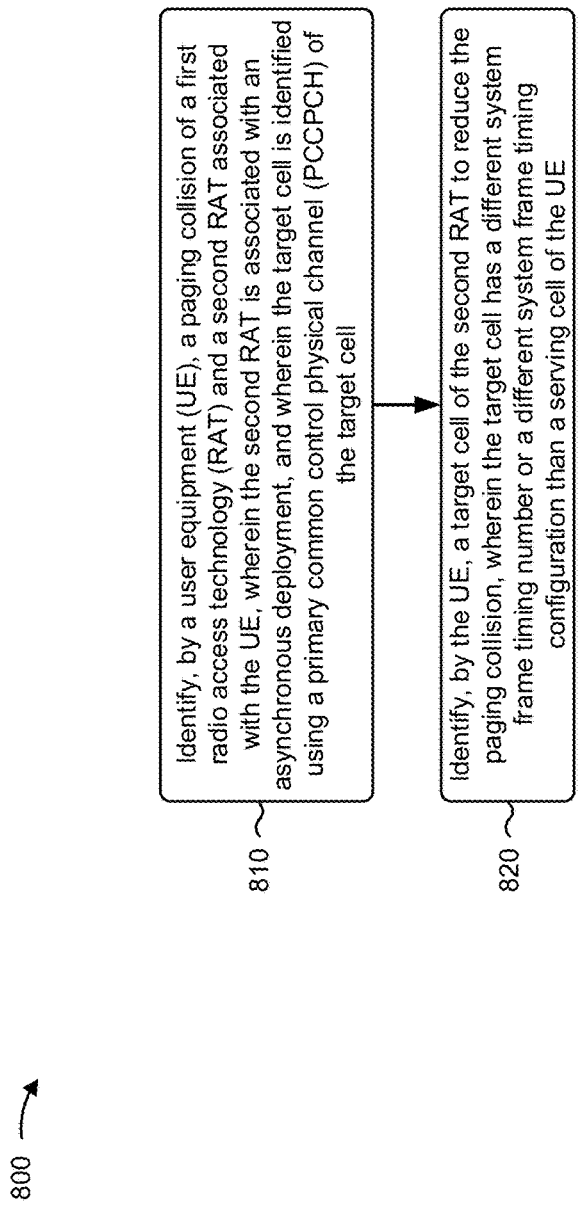
FIG. 8 is a diagram illustrating an example process performed, for example, by a wireless communication device, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 145, 250) performs selection of a target cell associated with an asynchronous RAT based at least in part on detecting a paging collision.

As shown in FIG. 8, in some aspects, process 800 may include identifying, by a user equipment (UE), occurrence of one or more collisions of paging of a first radio access technology (RAT) and of paging of a second RAT associated with the UE, wherein the second RAT is associated with an asynchronous deployment, and wherein the target cell is identified using a primary common control physical channel (PCCPCH) of the target cell (block 810). For example, the UE may identify occurrence of one or more collisions of paging of a first cell and of paging of a second cell. In some aspects, the first cell may be associated with a first RAT and the second cell may be associated with a second RAT. In aspects, the first RAT may be a synchronous RAT and the second RAT may be an asynchronous RAT. Additionally, or alternatively, both RATs may be asynchronous RATs. In some aspects, the UE may detect the occurrence of one or more collisions of paging the first RAT and of paging of the second RAT based at least in part on channel measurements associated with the first RAT and/or the second RAT, frame timing or frame numbering information associated with the first RAT and/or the second RAT, and/or the like.

As shown in FIG. 8, in some aspects, process 800 may include identifying, by the UE, a target cell of the second RAT to reduce the occurrence of one or more collisions, wherein the target cell has at least one of a different temporal system frame numbering or a different system frame timing configuration than a serving cell of the UE (block 820). For example, the UE may identify a target cell for reselection. The target cell may be associated with the second RAT (e.g., the asynchronous RAT). For example, the target cell may have at least one of a different temporal system frame numbering or a different system frame timing configuration than a serving cell (e.g., associated with the second RAT and therefore possibly associated with the first RAT given the occurrence of one or more collisions, or associated with the first RAT) of the UE. In some aspects, the serving cell of the UE may be associated with the first RAT. Additionally, or alternatively, the serving cell of the UE may be associated with the second RAT. In some aspects, the target cell is identified using a PCCPCH of the target cell.

Process 800 may include additional aspects, such as any single aspect or any combination of aspects described below.

In some aspects, the occurrence of one or more collisions is associated with a first discontinuous reception (DRX) cycle associated with the first RAT and a second DRX cycle associated with the second RAT. In some aspects, a length of the first DRX cycle is a multiple of a length of the second DRX cycle. In some aspects, the UE is configured to reselect to the target cell from the serving cell. In some aspects, the target cell is a highest ranked target cell, of a plurality of target cells associated with different temporal system frame numbering than the serving cell, with regard to at least one of a signal strength or a quality parameter. In some aspects, the UE is configured to store information identifying the system frame numbering of the plurality of target cells. In some aspects, the UE is configured to determine the information identifying the system frame numbering of the plurality of target cells while the UE is camped on the serving cell. In some aspects, the UE is configured to determine the information identifying the system frame numbering of the plurality of target cells while the UE is camped on the serving cell and based at least in part on the PCCPCH. In some aspects, the information identifying the system frame numbering of the plurality of target cells is stored when the occurrence of one or more paging collisions is identified. In some aspects, the information identifying the system frame numbering of the plurality of target cells is used to identify the target cell. In some aspects, the information identifying the system frame numbers of the plurality of target cells is stored only when the paging collision is identified. In some aspects, the target cell is identified based at least in part on a system frame timing number of the target cell being different than a system frame timing number of the serving cell by at least a threshold amount. In some aspects, the target cell is identified based at least in part on a system frame number of the target cell being different than a system frame number of the serving cell. In some aspects, the target cell is identified based at least in part on a maximum page duration of the first RAT. In some aspects, the first RAT is a same RAT as the second RAT. In some aspects, the first RAT is a different RAT than the second RAT. In some aspects, the serving cell is associated with a third RAT that is different from the second RAT. In some aspects, the serving cell is associated with the second RAT. In some aspects, the UE is a dual subscriber identity module (SIM) dual standby UE. In some aspects, the target cell is identified without reading a system information block-5 (SIB-5) of the target cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:
1. A method of wireless communication performed by a user equipment (UE), comprising:
    identifying occurrence of one or more collisions of paging of a first radio access technology (RAT) and paging of a second RAT associated with the UE, wherein the second RAT is associated with an asynchronous deployment; and identifying a target cell of the second RAT to reduce the occurrence of the one or more collisions,
wherein the target cell has at least one of a different temporal system frame numbering or a different system frame timing configuration than a serving cell of the UE,
wherein the target cell is identified based at least in part on a maximum page duration of the first RAT, and
wherein the target cell is identified using a primary common control physical channel (PCCPCH) of the target cell.

2. The method of claim 1, wherein the occurrence of the one or more collisions is associated with a first discontinuous reception (DRX) cycle associated with the first RAT and a second DRX cycle associated with the second RAT.

3. The method of claim 2, wherein a length of the first DRX cycle is a multiple of a length of the second DRX cycle.

4. The method of claim 1, wherein the UE is configured to reselect to the target cell from the serving cell.

5. The method of claim 1, wherein the target cell is a highest ranked target cell, of a plurality of target cells associated with respective system frame numbering different than the serving cell, with regard to at least one of a signal strength or a quality parameter.

6. The method of claim 5, wherein the UE is configured to store information identifying the respective system frame numbering.

7. The method of claim 6, wherein the UE is configured to determine the information identifying the respective system frame numbering while the UE is camped on the serving cell and based at least in part on the PCCPCH.

8. The method of claim 6, wherein the information identifying the respective system frame numbering is used to identify the target cell.

9. The method of claim 6, wherein the information identifying the respective system frame numbering is stored when the occurrence of the one or more collisions is identified.

10. The method of claim 1, wherein the target cell is identified based at least in part on a system frame timing number of the target cell being different than a system frame timing number of the serving cell by at least a threshold amount.

11. The method of claim 1, wherein the target cell is identified based at least in part on a system frame number of the target cell being different than a system frame number of the serving cell.

12. The method of claim 1, wherein the first RAT is a same RAT as the second RAT.

13. The method of claim 1, wherein the first RAT is a different RAT than the second RAT.

14. The method of claim 1, wherein the serving cell is associated with a third RAT that is different from the second RAT.

15. The method of claim 1, wherein the UE is a dual subscriber identity module (SIM) dual standby UE.

16. The method of claim 1, wherein the target cell is identified without reading a system information block-5 (SIB-5) of the target cell.

17. A user equipment (UE) for wireless communication, comprising:
memory; and
one or more processors coupled to the memory, the memory and the one or more processors configured to:
identify occurrence of one or more collisions of paging of a first radio access technology (RAT) and paging of a second RAT associated with the UE,
wherein the second RAT is associated with an asynchronous deployment; and
identify a target cell of the second RAT to reduce the occurrence of the one or more collisions,
wherein the target cell has at least one of a different temporal system frame numbering or a different system frame timing configuration than a serving cell of the UE,
wherein the UE is configured to store information identifying respective system frame numbering of a plurality of target cells that include the target cell, and
wherein the target cell is identified using a primary common control physical channel (PCCPCH) of the target cell.

18. The UE of claim 17, wherein the UE is configured to reselect to the target cell from the serving cell.

19. The UE of claim 17, wherein the target cell is a highest ranked target cell, of the plurality of target cells, with regard to at least one of a signal strength or a quality parameter.

20. The UE of claim 17, wherein the UE is configured to determine the information identifying the respective system frame numbering of the plurality of target cells while the UE is camped on the serving cell and based at least in part on the PCCPCH.

21. The UE of claim 17, wherein the information identifying the respective system frame numbering of the plurality of target cells is used to identify the target cell.

22. The UE of claim 17, wherein the UE is a dual subscriber identity module (SIM) dual standby UE.

23. The UE of claim 17, wherein the target cell is identified without reading a system information block-5 (SIB-5) of the target cell.

24. A non-transitory computer-readable medium storing one or more instructions for wireless communication, the one or more instructions comprising:
one or more instructions that, when executed by one or more processors of a user equipment (UE), cause the one or more processors to:
identify occurrence of one or more collisions of paging of a first radio access technology (RAT) and paging of a second RAT associated with the UE,
wherein the second RAT is associated with an asynchronous deployment; and
identify a target cell of the second RAT to reduce the occurrence of the one or more collisions,
wherein the target cell has at least one of a different temporal system frame numbering or a different system frame timing configuration than a serving cell of the UE,
wherein the UE is configured to store information identifying respective system frame numbering of a plurality of target cells that include the target cell, and
wherein the target cell is identified using a primary common control physical channel (PCCPCH) of the target cell.

25. The non-transitory computer-readable medium of claim 24, wherein the target cell is identified without reading a system information block-5 (SIB-5) of the target cell.

26. The non-transitory computer-readable medium of claim 24, wherein the information identifying the respective system frame numbering of the plurality of target cells is used to identify the target cell.

27. An apparatus for wireless communication, comprising:
- means for identifying occurrence of one or more collisions of paging of a first radio access technology (RAT) and paging of a second RAT associated with the apparatus,
    - wherein the second RAT is associated with an asynchronous deployment; and
- means for identifying a target cell of the second RAT to reduce the occurrence of the one or more collisions,
    - wherein the target cell has at least one of a different temporal system frame numbering or a different system frame timing configuration than a serving cell of the apparatus,
    - wherein the target cell is identified based at least in part on a maximum page duration of the first RAT, and
    - wherein the target cell is identified using a primary common control physical channel (PCCPCH) of the target cell.

28. The apparatus of claim 27, further comprising:
- means for storing information identifying respective system frame numbering of a plurality of target cells that include the target cell.

29. The apparatus of claim 28, wherein the target cell is a highest ranked target cell, of the plurality of target cells, with regard to at least one of a signal strength or a quality parameter.

\* \* \* \* \*